Figure 1:
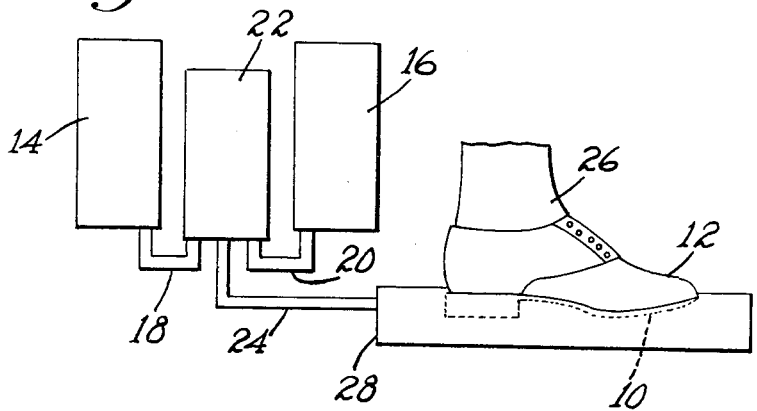

United States Patent
Appleton

[15] 3,670,070
[45] June 13, 1972

[54] PROCESSES FOR MOLDING POLYURETHANE FOAM ARTICLES

[72] Inventor: Daniel Appleton, Topsfield, Mass.
[73] Assignee: USM Corporation, Boston, Mass.
[22] Filed: Dec. 17, 1968
[21] Appl. No.: 784,361

[52] U.S. Cl.....................264/244, 260/2.5 AB, 260/2.5 AC, 260/2.5 AM, 264/45, 264/54
[51] Int. Cl. .....................................A43d 65/00, B29h 7/08
[58] Field of Search..................260/18 TN, 2.5 AB, 2.5 AC, 260/75 TNB, 75 TNC, 77.5 AB, 77 AC, 2.5 AP; 264/54, 45, 244, 255

[56] References Cited

UNITED STATES PATENTS

| | | | |
|---|---|---|---|
| 3,419,509 | 12/1968 | Willett | 260/2.5 X |
| 3,492,255 | 1/1970 | Cobbledick | 260/75 NB |
| 3,450,648 | 6/1969 | Windemuth | 260/2.5 AC |
| 3,429,855 | 2/1969 | Cobbledick | 260/77.5 AB |
| 3,395,108 | 7/1968 | Cobbledick | 260/2.5 AB |
| 3,136,732 | 6/1964 | Kaestner | 260/2.5 AB |
| 3,061,557 | 10/1962 | Hostettler | 260/2.5 AB |
| 3,447,251 | 6/1969 | Drexler | 264/244 |
| 3,390,213 | 6/1968 | Rollman | 264/54 |
| 3,345,664 | 10/1967 | Ludwig | 264/45 |
| 3,305,895 | 2/1967 | Ludwig | 264/255 |
| 3,160,921 | 12/1964 | Ludwig | 264/255 |
| 3,018,517 | 1/1962 | Ludwig | 264/54 |
| 3,467,606 | 9/1969 | Rice | 260/2.5 |
| 2,620,516 | 12/1952 | Müller | 260/77.5 AM |

FOREIGN PATENTS OR APPLICATIONS

| | | | |
|---|---|---|---|
| 720,528 | 10/1965 | Canada | 260/77.5 |
| 909,358 | 10/1962 | Great Britain | 260/2.5 |
| 1,134,345 | 11/1968 | Great Britain | |
| 997,369 | 7/1965 | Great Britain | |
| 980,139 | 1/1965 | Great Britain | |
| 690,621 | 7/1964 | Canada | |
| 1,243,116 | 8/1960 | France | |

OTHER PUBLICATIONS

Polyurethanes, Chemistry, Technology and Properties; Phillips Iliffe Books Ltd. London; 1964, 91–92
Polyurethanes, Chemistry and Technology: Part I Chemistry, Saunders and Frisch; Interscience; N.Y. 1962; 227–8
Polyurethanes Chemistry and Technology; Part II Technology; Saunders and Frisch; Interscience; N.Y. 1964; p. 212

*Primary Examiner*—Donald E. Czaja
*Assistant Examiner*—C. Warren Ivy
*Attorney*—W. Bigelow Hall, Richard A. Wise and Benjamin C. Pollard

[57] ABSTRACT

Process for molding polyurethane foam articles, particularly for molding polyurethane foam outsoles onto shoe uppers in which relative speeds of development of foam and viscosity in the mixture are controlled through a coaction of mixed catalysts in the reactive mixture.

6 Claims, 2 Drawing Figures

Inventor
Daniel Appleton
By his Attorney
Benjamin C. Pollard

PROCESSES FOR MOLDING POLYURETHANE FOAM ARTICLES

FIELD OF THE INVENTION

This invention relates to polyurethane foam molding and particularly to direct molding of polyurethane foam to form soles onto shoe uppers.

BACKGROUND OF THE INVENTION

It has been proposed heretofore to mold polyurethane foam outsoles directly onto shoes. However, outsoles have severe requirements as to mechanical properties because of the flexing, abrasion, shock and other stresses to which an outsole is subjected as well as to the extreme ranges of temperatures, water, oil and other use conditions. To attain these conditions it is necessary that the polyurethane foam be fully and uniformly cured and that it have closed cells.

Efforts to achieve the desired combination of properties in a molded-on shoe sole have encountered serious manufacturing problems. To be economically acceptable, the time between filling the sole mold and removing the shoe with the attached sole from the mold must be short. But rapid curing compositions have built up viscosity so fast that complete filling of the mold and adhesion of the polyurethane to the upper have often been unsatisfactory. Also many rapid curing systems have given an undesirable type of cell structure.

SUMMARY OF THE INVENTION

It is an object of the present invention to provide a process for generating and molding polyurethane foam outsoles of good physical character onto shoes in which complete filling and rapid complete uniform cure of the polyurethane foam are obtained.

To these ends and in accordance with a feature of the present invention I have provided a process and composition adapted for dispensing in successive shots to form a series of cellular polyurethane bodies, in which reagents including water and other blowing agent, organic compound providing a plurality of active hydrogens, and an organic compound providing a plurality of —NCO groups for combining to form a tough, flex crack resistant material for outsoles, are caused to foam and cure with the aid of a combination of catalysts to provide an initial stage of rapid foam development before high viscosity build up to give good mold filling and adhesion, and a rapid and complete curing stage at the end of the first stage.

Figure 2:
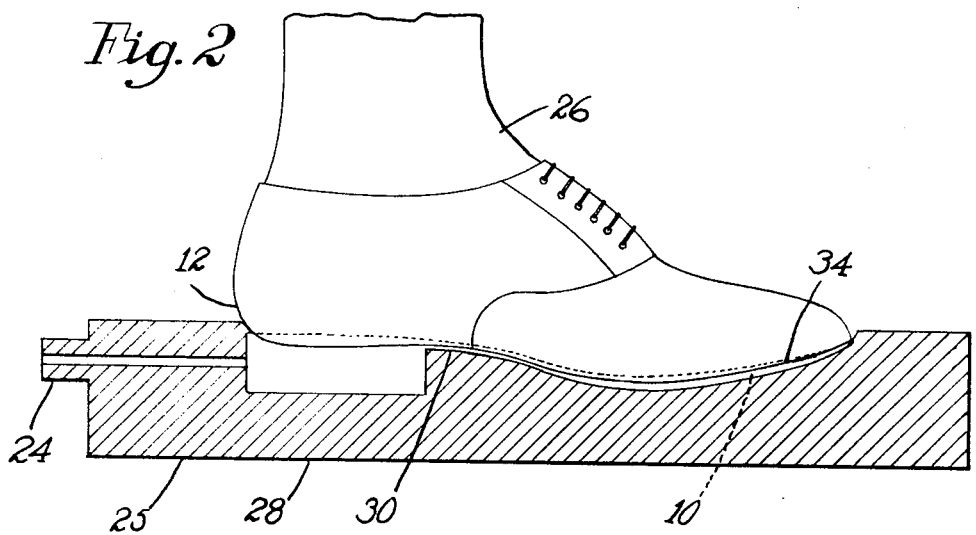

The invention will be described further in connection with the attached drawings in which:

FIG. 1 is a schematic view of equipment useful in practicing the method of the present invention; and FIG. 2 is a view on a larger scale of a portion of the system including the mold and a shoe upper disposed in relation thereto with parts broken away.

The molding of polyurethane foam tread members 10 on shoe uppers 12 (see FIG. 1) includes the steps of supplying measured relative quantities of reactive components from supply chambers 14 and 16 through conduits 18 and 20 respectively to a high speed mixer 22, mixing the components and discharging the mixture through conduit 24 into a molding chamber 25 defined by the bottom of a shoe upper 12, shown mounted on a form 26, and the tread-forming mold 28. The mixture foams promptly to fill the molding chamber 25 and establish adhesive engagement with the bottom of the shoe upper. After the mixture has reacted to develop strength and resilience, the shoe 12 with the tread member 10 attached to it is separated from the mold 28.

Under shoemaking conditions, successive shots of a size to fill the molding space are mixed and injected into successive molds. A reactive system for this use must meet the special requirement of reacting sufficiently fast to develop strength and resilience to allow removal from the mold within an economically acceptable time, suitably within about 2 minutes. On the other hand the reaction mixture must retain a viscosity low enough to allow it to flow uniformly through even relatively thin cross section (See FIG. 2) portions of the space between the shoe and mold, e.g. in the shank portion 30, ball portion 32 and toe portion 34, to fill the mold 28 completely and to wet and adhere to the bottom of the shoe upper 12, while at the same time the mixture must develop viscosity sufficient to retain the blowing gas for expansion of the mixture to fill the molding chamber 25.

I have found that the special requirements may be satisfied by a novel reactive mixture in which the usual relative rates of the several physical changes occurring in the reaction are modified. In a first stage of reaction of this system there is provided a controlled initial increase in viscosity to a value sufficient to retain the blowing gas within the reaction mixture; but the viscosity increase is sufficiently low for a period thereafter that the mixture will flow readily under the expanding effect of the gas to fill all portions of the molding chamber 25 and to wet the attaching surfaces of the bottom of a shoe upper 12. At this point a second stage begins with rapid increase in viscosity, solidification to resilient condition and development of strength to allow rapid demolding of the sole.

This special action is obtained by a novel combination of catalysts in controlled relative proportions including a first catalyst having an induction period in which it produces no substantial increase in the viscosity of the reaction mixture and a second catalyst or catalyst mixture which promotes reaction to give prompt viscosity build up. The proportions are such that stage one is effected almost entirely by the second catalyst or catalyst mixture used in an amount which will complete the action of this stage at about the time the first catalyst has completed its induction stage, and becomes effective for the rapid completion of the solidification and development of the strength constituting the second stage.

A desirable resilient polyurethane for use as tread members, e.g. outsoles or heels of footwear are prepared by condensation and polymerization of a material having a plurality of active hydrogen groups with a material providing a plurality of —NCO groups. A wide variety of materials providing active hydrogen may be used; but it is preferred to use a mixture of diols and diamines. Among the diols which have been found useful are the polyester materials from polymerization of $\epsilon$-caprolactone, polyester diols from condensation and polymerization of glycols and dicarboxylic acids, and polyalkylene ether diols. Suitable dicarboxylic acids for reaction with glycols to form polyesters include sebacic acid, azelaic acid, and adipic acid; and useful glycols include ethylene glycol, diethylene glycol, 1,4 butane diol, etc. It is preferred that the polyester diols and the polyether diols forming part of the reaction mixture for combination with isocyanates have molecular weights of above about 1,500 and below about 3,500.

Diamines useful in admixture with the diols include 4,4'-methylene-bis-orthochloroaniline, phenylene diamine, cumene diamine, toluene diamine and dichlorobenzodine. In addition to increasing the speed of reaction, it appears that these relatively low molecular weight materials increase the toughness of the final polyurethane material. It is noted also that 1,4 butane diol has the ability to increase the toughness of the final polyurethane. The low molecular weight diamine materials (molecular weight 75 to 300) are ordinarily used to the extent of from about 5 percent to about 15 percent by weight based on the weight of the polyester and/or polyether diol materials described in the preceding paragraph. The 1.4 butane diol would be used in amount of from about 5 percent to about 25 percent by weight of the polyester and/or polyether diol.

For combination with the active hydrogen material, there are used materials providing a plurality of —NCO groups including tolylene diisocyanate, diphenylmethane diisocyanate, polyarylene polyisocyanate (PAPI) and the condensate of MDI or toluene diisocyanate and low molecular weight diols or triols such as dipropylene glycol, diethylene glycol and trimethylolpropane in a ratio of two to four —NCO to one —OH.

The polyurethane material may be expanded to form the desired cellular product by the interaction of water with isocyanate to generate $CO_2$ or, alternatively, volatile organic liquids such as methylene chloride, trichloromonofluoromethane and other volatile halogenated, preferably fluorine-containing organic liquids may be used. Where water is used, from 0.2 to 0.5 percent, preferably about 0.3 percent is used based on the weight of the resinous, e.g. diol material. Where a volatile organic liquid is used there will ordinarily be used from about 5 to about 7 parts by weight based on 100 parts by weight of the resin material.

The catalyst system is a combination of catalytic materials effective to cause rapid increase in viscosity together with catalyst materials having an induction period during which there is no substantial observable change in the viscosity of a catalyzed system followed by a period after the induction period, of exceptionally rapid viscosity build up, gelation and cure. Where the reaction of water and isocyanate is relied on to generate the blowing gas it may be desirable to include a third catalytic agent to speed up the generation of blowing gas. Effective cooperative action of the catalysts to give rapid and complete filling of the mold and wetting of the attaching surface of the shoe upper together with rapid development of strength sufficient to allow demolding of the polyurethane foam depends on selection and relative proportions of the catalysts to control the rate and sequence of chemical and physical changes. By using the special catalyst combination the development of viscosity needed to hold the gas and the expansion of the reaction mix to fill the mold are complete at approximately the end of the induction period of the second catalyst; but not so fast as to increase the viscosity to a point interfering with free flow of the reaction mix through narrow cross sections of the mold before filling of the mold is completed.

Catalysts effective to cause initial build up in viscosity include triethylene diamine, N,N,N',N' tetramethylene butane diamine, stannous octoate and lead naphthenate. These materials will ordinarily be used in proportion of from about 0.05 percent to about 0.7 percent by weight based on the weight of the resin, i.e. the diol and diamine component.

As the catalyst having an induction period during which only slight build up in viscosity is caused, there may be used mercuric salts of aliphatic and/or aromatic carboxylic acids. Among such materials are phenyl mercuric acetate, phenyl mercuric propionate, mercuric formate, mercuric acetate, mercuric isobutyrate, mercuric propionate, mercuric octoate, mercuric oleate, mercuric stearate, mercuric oxalate, mercuric adipate, mercuric benzoate, mercuric anthranilate, phenyl mercuric chloride, phenyl mercuric nitrate, mercuric naphthenate and phenyl mercuric oleate. This catalyst will be used in amount of from about 0.1 percent to about 0.3 percent, preferably about 0.15% by weight based on the weight of the resin.

For accelerating the reaction between water and isocyanate where this reaction is used to generate blowing gas, there may be used various catalysts known to have this effect including dibutyl tin dilaurate, triethylene amine, N-methyl morpholine, N ethyl morpholine and others. In general these are used in amount of from about 0.02 percent to about 0.1 percent by weight based on the weight of the resin.

The following examples are given to aid in understanding the invention, but it is to be understood that the invention is not restricted to the particular procedures, materials or conditions in the examples.

EXAMPLE I

The 2 parts of a reaction mix for forming a polyurethane foam molded-on outsole were as follows:

| Component | Parts By Weight |
| --- | --- |
| Part A | |
| Poly(ε-caprolactone) diol | 100.0 |
| (molecular weight 2000) | |
| 4,4' Methylene Bis Ortho-chloro Aniline | 13.4 |
| Dibutyl Tin Dilaurate | 0.10 |
| Triethylene Diamine | 0.30 |
| Phenyl Mercuric Propionate | 0.20 |
| Water | 0.36 |
| Part B | |
| Diphenyl Methane Diisocyanate | 30.7 |

Part A was brought to a temperature of about 60° C. and part B was brought to a temperature of about 40° C. The 2 parts were injected through separate ports into the mixing chamber of a high speed mixer and mixed for about 4 seconds. The mixture was then promptly forced into the space between a sole mold and the bottom of a shoe upper held in sealing engagement to the mold. All of the material had been introduced into the mold in about 6 seconds from the time of initiating mixing and the filling of all parts of the mold and entry of the foaming material into wetting engagement with the bottom of the shoe upper was completed in about 8 seconds from the initiating of mixing.

After 120 seconds from initiating of the mixing of the reactive materials, the shoe upper was separated from the mold taking the molded urethane sole with it.

After a further period of 5 minutes, it was found that the sole was adhered so strongly to the upper that it could not be separated without tearing the material. The molded sole reproduced the contours of the mold accurately and had a uniform good appearing surface. The sole did not develop cracks during a flexing test and had excellent wear resistance.

EXAMPLE II

The procedure of Example I was repeated using a reactive mixture in which 100 parts of poly(oxytetramethylene ether) diol of 2,000 molecular weight was substituted for the 100 parts of poly(ε-caprolactone) diol used in Example I.

The shoe with sole molded thereon was readily removed from the mold and the sole produced had an excellent surface with good reproduction of the contours of the mold and showed good flex and wear properties.

EXAMPLE III

The procedure of Example I was repeated with the substitution of 150 parts of a poly(diethylene glycol adipate) diol having a molecular weight of 3,000 for the 100 parts of poly(ε-caprolactone) diol used in Example I.

The shoe with sole molded thereon was readily removed from the mold and the sole produced has an excellent surface with good reproduction of the contours of the mold and showed good flex and wear properties.

EXAMPLE IV

The procedure of Example I was repeated with the substitution of 100 parts of a poly(oxypropylene) diol having a molecular weight of 2,000 for the 100 parts of poly(ε-caprolactone) diol used in Example I.

The shoe with sole molded thereon was readily removed from the mold and the sole produced had an excellent surface with good reproduction of the contours of the mold and showed good flex and wear properties.

EXAMPLE V

The procedure of Example I was repeated with the substitution of 150 parts of a poly(ε-caprolactone) diol/TDI adduct having a molecular weight of 3,000 for the 100 parts of poly(ε-caprolactone) diol used in Example I.

The sole material thus produced had good resistance to cracking during flexing and excellent wear resistance.

EXAMPLE VI

The 2 parts of a reaction mix for forming a polyurethane foam molded-on outsole were as follows:

| Component | Parts By Weight |
|---|---|
| Part A | |
| Poly(ε-caprolactone) diol (molecular weight 2000) | 100.0 |
| 4,4' Methylene Bis Ortho-Chloro Aniline | 13.4 |
| Triethylene Diamine | 0.30 |
| Phenyl Mercuric Propionate | 0.20 |
| Methylene Chloride | 5.0 |
| Part B | |
| Diphenyl Methane Diisocyanate | 26.4 |

Part A at a temperature of about 60° C. and part B at a temperature of about 40° C. were injected through separate ports into the mixing chamber of a high speed mixer and mixed for about 4 seconds. The mixture was then promptly forced into the space between a sole mold and the bottom of a shoe upper held in sealing engagement to the mold. All of the material had been introduced into the mold in about 6 seconds from the time of initiating mixing. The filling of all parts of the mold and entry of the foaming material into wetting engagement with the bottom of the shoe upper was completed in about 8 seconds from the initiating of mixing.

After 120 seconds from initiating of the mixing of the respective materials, the shoe upper was separated from the mold taking the molded urethane sole with it.

After a further period of 5 minutes, it was found that the sole was adhered so strongly to the upper that it could not be separated without tearing the material. The molded sole reproduced the contours of the mold accurately and had a uniform good appearing surface. The sole did not develop cracks during a flexing test and had excellent wear resistance.

EXAMPLE VII

| Component | Parts By Weight |
|---|---|
| Part A | |
| Poly(ε-caprolactone) Diol (molecular weight 2000) | 100.0 |
| 4,4' Methylene Bis-Ortho-chloro-aniline | 13.4 |
| Dibutyl Tin Dilaurate | 0.10 |
| Triethylene Diamine | 0.20 |
| Phenyl Mercuric Propionate | 0.20 |
| Water | 0.36 |
| Part B | |
| Diphenyl Methane Diisocyanate | 30.7 |

The procedure of Example VI was followed to form a molded-on sole on a shoe upper.

The sole so formed was adhered strongly to the shoe upper and reproduced the contours of the mold accurately. The sole had good crack resistance during flexing and very good wear resistance.

Having thus described my invention what I claim as new and desire to secure by Letters Patent of the United States is:

1. The method of molding polyurethane foam comprising the steps of rapidly mixing an organic compound having more than one active hydrogen comprising a mixture of an organic diol (A) having a molecular weight above about 1,500 and from about 5 percent to about 15 percent by weight based on the weight of said organic diol (A) of 4,4' methylene bis orthochloro aniline with an organic compound having more than one —NCO group in slight excess of stoichiometric quantity, a blowing agent, a first catalyst comprising a mercury salt of a carboxylic acid for the reaction between the compound having —NCO groups and that having active hydrogens, said first catalyst having an induction period during which it produces no substantial increase in the viscosity of the reaction mixture and having a post-induction period in which it promotes rapid viscosity build up, gelation and cure, and a second catalyst selected from the group consisting of triethylene diamine, N,N,N',N' tetramethylene butane diamine, stannous octoate and lead naphthenate known per se catalytically to promote the reaction between the compound having the —NCO groups and that having active hydrogens to cause prompt viscosity increase in the reaction mixture, said second catalyst being employed in quantity based on its catalytic activity to cause increase in viscosity at an early point in said induction period to a value which will retain blowing gas within the reaction mixture, said quantity being below that which, based on its known catalytic activity, will cause so great an increase in viscosity before the end of the induction period as to interfere with the flow of the reaction mixture through small cross sections of a molding chamber, supplying said reaction mixture to said molding chamber before the end of said induction period, reacting the compounds in said mixture and expanding the reacting mixture by the blowing agent to fill said chamber during said induction period and continuing said reaction to convert said reaction mixture into a tough, resilient polyurethane foam in said post-induction period and removing said polyurethane foam from engagement with the mold.

2. The method as defined in claim 1 in which a shoe upper is assembled with its bottom portion against a tread member-forming mold to define said molding chamber, said reaction mixture is brought into wetting adhesive engagement with said bottom portion through expansion of said reaction mixture during said induction period, said reaction mixture is converted to a resilient polyurethane foam tread member adhering to said bottom portion in said post-induction period and said shoe upper with said polyurethane foam tread member adhered to it are removed from engagement with the mold.

3. The method as defined in claim 2 in which said blowing agent is a volatile organic liquid having a boiling point below the temperature of the reaction mixture during said induction period.

4. The method as defined in claim 2 in which said reaction mixture includes water, said blowing agent is gas generated by reaction of water and —NCO and in which a third catalyst is included to accelerate the reaction of water with isocyanate to generate said blowing gas.

5. The method as defined in claim 4 in which said third catalyst is a member of the group consisting of dibutyl tin dilaurate, triethylene amine, N-methyl morpholine and N ethyl morpholine.

6. The method as defined in claim 2 in which said organic diol (A) is selected from the group consisting of polyester diols and polyalkylene ether diols.

* * * * *